United States Patent
Chang

[19]

[11] Patent Number: 6,078,021
[45] Date of Patent: Jun. 20, 2000

[54] APPARATUS AND METHOD OF LASER WELDING INSIDE BELLOWS JOINTS AND SPACER FOR MANUFACTURING BELLOWS

[76] Inventor: Dale U. Chang, 2900 Sun Bittern Ct., Windermere, Fla. 34786

[21] Appl. No.: 08/921,291

[22] Filed: Aug. 29, 1997

[51] Int. Cl.[7] .................................................. B23K 26/00
[52] U.S. Cl. .............................. 219/121.63; 219/121.64
[58] Field of Search ......................... 219/121.63, 121.64; 29/454; 493/940; 364/474.08

[56] References Cited

U.S. PATENT DOCUMENTS

| | | | |
|---|---|---|---|
| 3,482,302 | 12/1969 | Williams | 29/454 |
| 3,530,566 | 9/1970 | McMurry et al. | 29/454 |
| 3,626,582 | 12/1971 | Melill | 29/454 |
| 3,918,622 | 11/1975 | Larsen | 228/8 |
| 4,231,824 | 11/1980 | Cooper . | |
| 4,457,213 | 7/1984 | Morgan | 29/454 |
| 4,644,129 | 2/1987 | Miller . | |
| 4,760,236 | 7/1988 | Stoll . | |
| 4,766,285 | 8/1988 | Decailloz et al. . | |
| 4,998,005 | 3/1991 | Rathi et al. | 219/121.83 |
| 5,001,324 | 3/1991 | Aiello et al. . | |
| 5,026,967 | 6/1991 | Bell et al. . | |
| 5,045,668 | 9/1991 | Neiheisel et al. . | |
| 5,053,601 | 10/1991 | Landtwing et al. | 219/121.63 |
| 5,154,108 | 10/1992 | McClelland et al. | 29/454 |
| 5,155,322 | 10/1992 | McClellan et al. | 219/121.63 |
| 5,168,141 | 12/1992 | Tashjian et al. . | |
| 5,239,157 | 8/1993 | Sakano et al. | 219/121.64 |
| 5,410,123 | 4/1995 | Rancourt | 219/121.63 |
| 5,478,983 | 12/1995 | Rancourt | 219/121.63 |

FOREIGN PATENT DOCUMENTS

| | | | |
|---|---|---|---|
| 45-39172 | 12/1970 | Japan | 29/454 |

OTHER PUBLICATIONS

Six Reasons for InstaMark, Laser Applications, Inc., Dale U. Chang, Feb. 22, 1994, pp. 1–4.

Primary Examiner—Geoffrey S. Evans
Attorney, Agent, or Firm—James H. Beusse; Holland & Knight LLP

[57] ABSTRACT

A laser welding apparatus is for laser welding an inner joint between first and second bellows diaphragms. The apparatus preferably includes a first clamp having an opening therein and having portions adjacent the opening defining a first clamping surface; and a second clamp having portions defining a second clamping surface, and wherein the first and second clamps are relatively movable to clamp the first and second metal bellows diaphragms together between the first and second clamping surfaces so that the openings in the bellows diaphragms are generally aligned with the opening in the first clamp. The apparatus also preferably includes a laser for generating a laser beam, and a beam directing element positioned in the opening of the first clamp and the openings of the first and second bellows diaphragms for directing the laser beam to weld the inner joint between the first and second bellows diaphragms. The opening of the first clamp and the recess of the second clamp are preferably sized to expose a predetermined radially inwardly extending portion of the first and second bellows diaphragms to facilitate welding with the laser beam. In addition, the apparatus also preferably includes a rotating drive arrangement for relatively rotating the first and second clamps, and the laser beam directing means to weld the inner joint. A non-metallic spacer may be positioned between the bellows diaphragms.

45 Claims, 5 Drawing Sheets

| PART NUMBER : | TESTPART | OPEN | LIMIT : | NO LIMIT | |
|---|---|---|---|---|---|
| INSIDE DIAMETER (INCH) | 1 | LASER POWER (AMP) | 20 | POWER RAMP | |
| MATERIAL | TEST | WLD SPEED (IPM) | 100 | -UP: INIT. POWER (% OF LAR PWR) | 20 |
| TKNAS(DIAPHRAGM) (INCH) | 0.05 | * * | | -UP: RISING TIME (SECOND) | 2 |
| DELAY 1 (∂) (RA) | 1.00 | OVERLAP (INCH) | 1 | -DN: ENDING POWER (% OF LAR PWR) | 20 |
| DELAY 2 (∂) (DC MOTOR) | 0.1 | * | | -DN: DECAY TM(S) (SECOND) | 2 |
| * | * | * | | GAS PURGE DELAY (SECOND) | 1 |
| * | * | * | | GAS OFF DELAY (SECOND) | 1 |
| * | * | * | | * | |
| * | * | * | | * | |

N  TEST PART
O  COMMENTS AND STUFF
T
E  [F2] - SAVE AND EXIT  [ESC] - EXIT

APPARATUS AND METHOD OF LASER WELDING INSIDE BELLOWS JOINTS AND SPACER FOR MANUFACTURING BELLOWS

FIELD OF THE INVENTION

The present invention relates to manufacturing of metal bellows, and, more particularly, to an apparatus, method and spacer for welding metal bellows.

BACKGROUND OF THE INVENTION

Precision metal bellows are widely used in a number of applications where movement is required, but where sealing is also desired. For example, where it is desirable to have a vacuum on the exterior or interior of the bellows, the bellows provides environmental sealing. In other words, a bellows may be used as a boot for protective sealing. A bellows may also be used as a mechanical actuator by controlling pressure within the bellows, for example.

A bellows may be formed by joining together a series of bellows diaphragms in a predetermined pattern. A typical diaphragm is a generally circular disk with concentric folds formed therein. The diaphragms are joined together so that adjacent inside edges are connected together and adjacent outside edges are connected, etc.

The conventional approach to joining the diaphragms has been to tungsten inert gas (TIG) weld both the inside and outside joints. Unfortunately, TIG welding is relatively slow and may produce inconsistent quality welds.

In general, when TIG welding a pair of diaphragms are positioned in side-by-side relation and the interior weld is first formed using an inside diameter welding machine. Once a sufficient number of welded pairs or convolutions are made, these are assembled and positioned on a spindle or arbor. Copper "chill rings" or spacers are positioned between opposing outer portions. The chill rings help control the heating and heat dissipation of the diaphragms. The assembled convolutions and chill rings are rotated on the arbor, and each outer seam is TIG welded. The arc welding torch is indexed to each of the seams for welding. An operator watches the welding arc through a stereo microscope for alignment before and during welding. This operation may be very tedious for the operator. Moreover, the outcome of the bellows depends largely on the skills, experience, acuity, attentiveness, and the physical condition of the operator.

Once the outer welds are completed the structure is removed from the arbor, and the copper chill rings are then removed and discarded. Unfortunately, the copper chill rings must be made to relatively exacting tolerances and are therefore relatively expensive. Moreover, once used the copper rings may be discarded, and new rings may be supplied and used for making the next bellows. Accordingly, the cost of manufacturing is increased because of the cost of the copper chill rings.

Precision metal bellows manufacturing has been relying on gas tungsten arc (GTAW) or TIG welding for metal bellows for the past 20 years. Many improvements have been made to the process including power control, pulsing techniques and torch configuration. Unfortunately, the conventional arc welding process has inherent limitations in terms of productivity and quality. The welding speed is relatively slow (10–20 inches per minute) and the weld quality degrades as the welding tip wears out. Constant adjustments and finesse are needed to maintain the weld quality. In addition, the weld quality depends largely on the skill and the acuity of the operator. The process is labor intensive and is not well suited for automation. The costs of disposable and consumable items are also high.

U.S. Pat. No. 3,918,622 to Larsen discloses tungsten inert gas (TIG) welding of the outer joint of a plurality of stacked diaphragms and with optical tracking of a weld immediately following the formation thereof to maintain precise torch alignment with the weld joint. The diaphragms to be welded are stacked on a rotatable arbor. A radiation source such as a lamp, is focused by a lens and directed by a mirror to the seam. Reflected light from the seam is sensed by two side-by-side phototransducers so that a difference in the two output signals indicates the lateral displacement of the seam. Unfortunately, the split photosensor system described may not accurately indicate the position of the relatively small seams of many commercially desirable bellows.

Also relating to joining diaphragms to form a metal bellows, U.S. Pat. No. 3,626,582 to Melill discloses diffusion bonding for the stacked diaphragms. The fabrication requires pressuring fixture tooling including an external steel cylindrical retainer ring and an internal steel cylindrical retainer plug, together with a force transmitting annular ram and multiple thin steel pressure support rings using to transmit the bonding forces of the high pressure ram. The process, unfortunately, is relatively complicated and expensive at it requires elevated temperatures of 1600–1700 degrees F at 500 PSI pressure for 5 hours for typical thin sheet metal titanium diaphragms.

Laser and electron beam apparatus have also been disclosed for welding the joints of metal bellows. For example, U.S. Pat. No. 4,760,236 to Stoll discloses a laser welding apparatus wherein the outer diameter welds are made one at a time to form pairs of diaphragms. The pair of diaphragms are pressed between opposing tooling fixture portions to ensure alignment. To form the inner welds, a series of pairs are positioned within an evacuated chamber and the laser beam is directed through the center opening to the inner weld positions. For both the inner and outer welds, the laser beam is directed at an oblique angle. Unfortunately, an oblique angle may cause a nonsymmetrical and low quality weld. Moreover, precise positioning of the laser beam for the inside welds may be difficult and result in poor quality welds.

U.S. Pat. Nos. 5,478,983 and 5,410,123 both to Rancourt disclose an apparatus for forming a bellows bladder using a laser beam to form the inner and outer welds. An oblong shaped laser spot is used for welding. In addition, a comb structure is used to separate and position interior joints and exterior joints for laser welding. Precise relative positioning requires high accuracy of the comb and little or no variations in the convolutions. In short, precise positioning of the laser beam relative to the weld areas may be difficult to achieve.

SUMMARY OF THE INVENTION

In view of the foregoing background, it is therefore an object of the present invention to provide an apparatus and related methods for forming a precision weld at the interior joints of a metal bellows.

It is another object of the present invention to provide a spacer and related methods for reducing the manufacturing cost for making a metal bellows.

These and other objects, advantages and features of the present invention are provided by an apparatus for laser welding an inner joint between first and second bellows diaphragms. The apparatus preferably includes a first clamp having an opening therein and having portions adjacent the opening defining a first clamping surface. The apparatus also preferably includes a second clamp having portions defining a second clamping surface, and wherein the first and second clamps are relatively movable to clamp the first and second metal bellows diaphragms together between the first and second clamping surfaces so that the openings in the bellows diaphragms are generally aligned with the opening in the first clamp.

The apparatus also preferably includes a laser for generating a laser beam, and laser beam directing means having at least a portion positioned in the opening of the first clamp and the openings of the first and second bellows diaphragms for directing the laser beam to weld the inner joint between the first and second bellows diaphragms. The second clamp may also have a recess in a medial portion thereof receiving the laser beam directing means therein. The opening of the first clamp and the recess of the second clamp are preferably sized to expose a predetermined radially inwardly extending portion of the first and second bellows diaphragms to facilitate welding with the laser beam. In addition, the apparatus also preferably includes rotating drive means for relatively rotating the first and second clamps, and the laser beam directing means to weld the inner joint between the first and second bellows diaphragms.

The apparatus may also include a frame, and the laser beam directing means may be connected to the frame. Accordingly, the rotating drive means rotates the first and second clamps relative to the laser beam directing means. The apparatus joins together only two diaphragms at one time to thereby complete this operation with highly accurate positioning. Accordingly, seam tracking equipment is not needed, but precision welding is achieved.

The laser may be one of an Nd:YAG laser, a diode laser, and a $CO_2$ laser. The laser beam directing means may comprise a mirror and mounting means for mounting the mirror through the opening of the first clamp and in the openings of the first and second bellows diaphragms. The laser beam directing means may also additionally or alternately include an optical fiber. For example, the laser beam directing means may include an optical fiber connected to the laser, and at least one optical element, such as a lens or mirror, in an optical path from the optical fiber to the weld area. The laser beam directing means may further comprise a focusing lens in an optical path of the laser beam. The laser beam directing means may comprise means for directing the laser beam to the joint within about 30 degrees from a mating surface defined between adjacent bellows diaphragms to thereby produce a high quality and symmetrical weld.

Another aspect of the invention relates to control of the apparatus. The apparatus may include a processor connected to the laser for controlling at least one parameter thereof. The apparatus may also further comprise a camera directed to the weld area for assessing weld quality and the processor may further comprise means cooperating with the camera and the laser for controlling a laser power based upon the weld quality. The processor may also include means for aligning the laser beam based upon an image from the camera. A filter may be positioned in an optical path with the camera to filter out the weld light. A display may preferably be connected to the camera. The processor may also include means for storing and recalling information relating to a bellows part designation and welding parameters associated therewith.

The apparatus may further comprise an index table carrying the second clamp. The index table may further comprise at least one additional similar clamp to permit welded bellows diaphragms to be removed and new bellows diaphragms to be loaded, and while one clamp is used during welding. The apparatus may also include positioning means for moving the first and second clamps between a clamped position and a separated position.

An inert gas supply, and inert gas delivery means may be used for delivering inert gas to the weld area. For example, the inert gas may be delivered to one or both of the interior and exterior of the weld area.

One method aspect of the invention is for forming a welded inner joint between first and second bellows diaphragms, and with each bellows diaphragm having an opening therein. The method preferably comprises the steps of: providing a first clamp having an opening therein, the first clamp having portions adjacent the opening defining a first clamping surface; providing a second clamp having portions defining a second clamping surface; and relatively positioning the first and second clamps to clamp the first and second metal bellows diaphragms together between the first and second clamping surfaces so that the openings in the bellows diaphragms are generally aligned with the opening in the first clamp. The method preferably further includes the steps of: positioning an optical element in the opening of the first clamp and the openings of the first and second bellows diaphragms; directing a laser beam to the optical element to weld the inner joint between the first and second bellows diaphragms; and relatively rotating the first and second clamps and the optical element to weld the inner joint between the first and second bellows diaphragms.

Another aspect of the invention relates to use of a spacer during manufacturing of the metal bellows. In other words, this aspect is directed to an assembly used during manufacture, as the spacers are removed when the bellows is complete. The assembly comprises a plurality of bellows diaphragms positioned in side-by-side relation, and a respective spacer between each pair of adjacent bellows diaphragms.

More particularly, according to this aspect of the invention, the spacer comprises a non-metallic material. The spacer preferably has a ring shape. In addition, the spacer preferably has a peripheral surface being aligned substantially flush with an imaginary cylinder defined by peripheral surfaces of the adjacent bellows diaphragms. The spacer may also have a parting slit therein to facilitate removal from the diaphragms.

The bellows diaphragms define a natural pitch; and the spacer may have a thickness in a range of about 0.5 to 1.5 times the natural pitch of the bellows diaphragms. In addition, the spacer may comprise a first portion with a generally rectangular cross-section defining opposing sidewalls contacting the adjacent bellows diaphragms, and a second portion extending radially outwardly from the first portion and having a reduced thickness so as to define a notch between adjacent bellows diaphragms. Each bellows diaphragm preferably has a predetermined thickness, and the first portion of the spacer preferably has a radial dimension of greater than about 0.5 times the predetermined thickness of each bellows diaphragm.

Further relating to preferred dimensions, the notch preferably has a predetermined width in a range of about 0.2 to 20 times the predetermined thickness of each bellows diaphragm. The notch preferably has a depth in a range of about 1 to 10 times the predetermined thickness of each bellows diaphragm.

The non-metallic material of the spacer preferably comprises at least one of plastic, rubber, glass, and ceramic. The non-metallic material may also have a relatively high melting temperature to resist melting during welding of the bellows diaphragms. In addition, the non-metallic material may comprise a material having a relatively low thermal conductivity less than a thermal conductivity of copper to thereby permit greater heating efficiency of the laser. The material may also have a relatively low absorption of the laser energy.

Another method aspect is for manufacturing a metal bellows comprising the step of: providing a plurality of non-metallic spacers and providing a plurality of metal bellows diaphragms; positioning the plurality of bellows diaphragms in side-by-side relation with a respective non-metallic spacer between each pair of adjacent bellows diaphragms; and welding the bellows diaphragms together to thereby form the convolutions of the metal bellows. The method may further comprise the step of removing the non-metallic spacers from the metal bellows after the welding step, and may include reusing the non-metallic spacers after removal.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout. Sizes and thickness may be exaggerated for clarity.

The terms "diaphragm", "convolution", and "segment" are used herein as follows: diaphragm refers to a thin gauge stamping in the shape of an annulus and with or without formed bends. Typically a male diaphragm and a female diaphragm are welded together to form a convolution. In other words, a convolution is a joined together pair of diaphragms. Similarly, a segment is one or more joined together convolutions, and a plurality of joined together segments may define a metal bellows.

Figure 1:
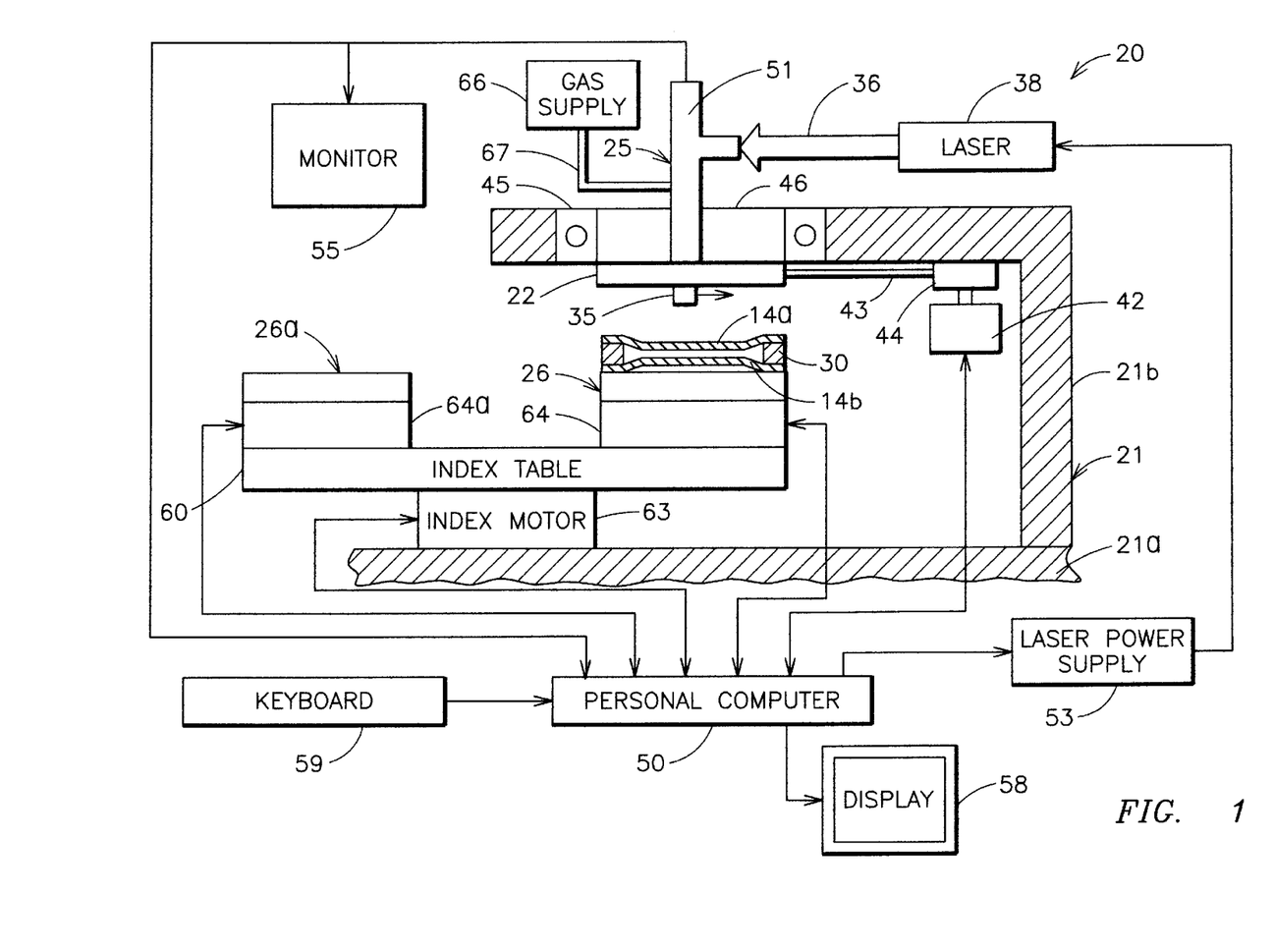
FIG. 1 is a schematic diagram of the apparatus in accordance with the present invention.
Figure 2:
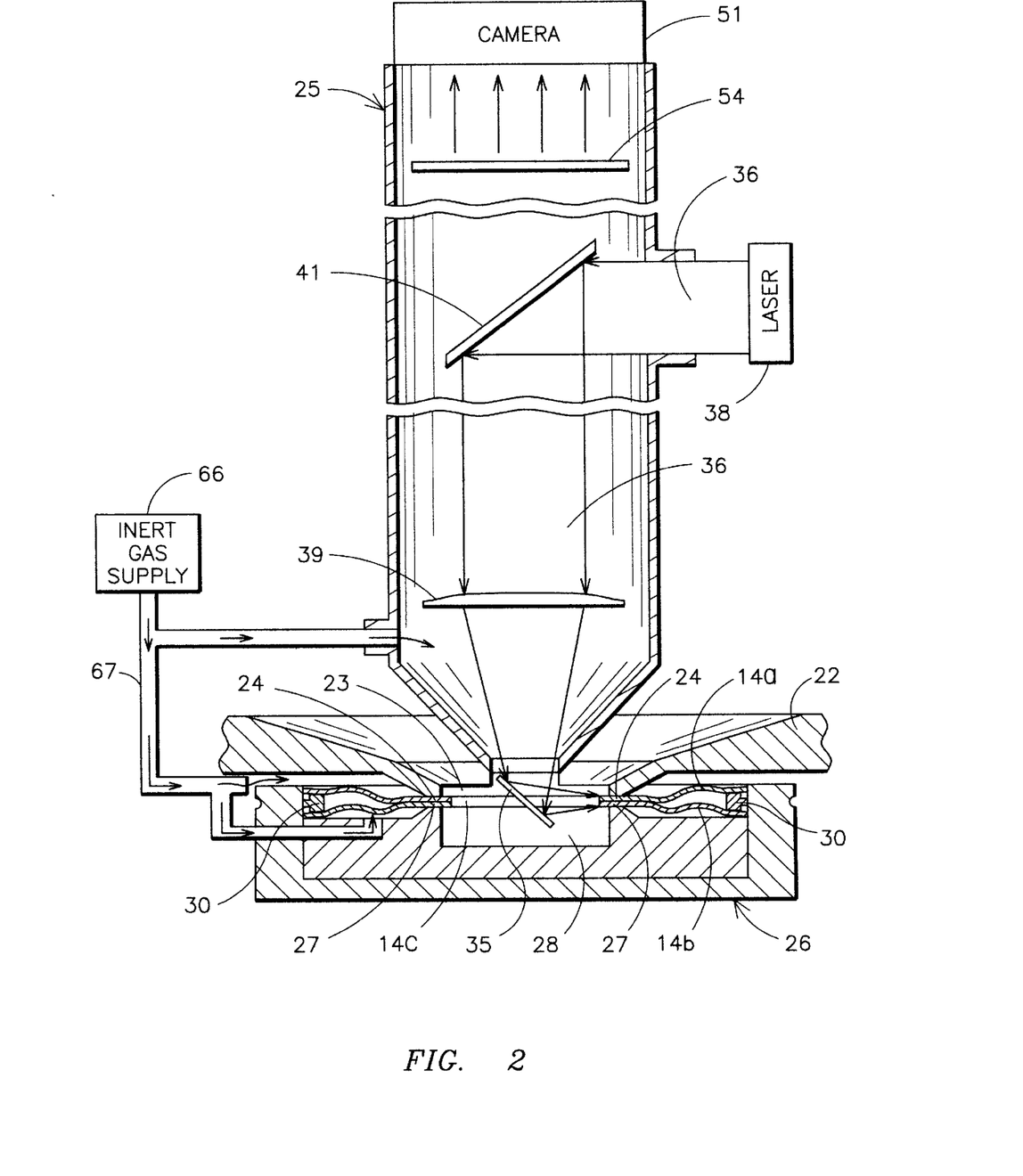
FIG. 2 is a greatly enlarged portion of the apparatus of FIG. 1.

Referring now initially to FIGS. 1 and 2, the apparatus 20 is described. The apparatus 20 is for laser welding the inner joint of a pair of diaphragms 14a, 14b to form a convolution. Of course, a plurality of convolutions, once formed, can be joined together to form a metal bellows by forming the outer welds. The outer joint welding process and an apparatus therefor are further described in U.S. patent application Ser. No. 08/921,292, entitled "Apparatus and Method for Laser Welding the Outer Joints of Metal Bellows" to the present applicant, and the entire disclosure of which is incorporated herein by reference.

The apparatus 20 includes a frame 21 including a portion 21a defining a horizontal surface, and a support portion or arm 21b extending upwardly therefrom. The apparatus 20 preferably includes a first clamp 22 having an opening 23 (FIG. 2) therein and having portions 24 adjacent the opening defining a first clamping surface 24. The apparatus 20 also preferably includes a second clamp 26 having portions defining a second clamping surface 27, and wherein the first and second clamps 22, 26 are relatively movable to clamp the first and second diaphragms 14a, 14b together between the first and second clamping surfaces. The spacer 30 is positioned between the peripheral edges of the diaphragms 14a, 14b. The openings 14c in the bellows diaphragms 14a, 14b are generally aligned with the opening 23 in the first clamp 22 as illustrated.

The apparatus 20 also preferably includes a laser 38 for generating a laser beam 36, and laser beam directing means having at least a portion positioned in the opening 23 of the first clamp 22 and the openings 14c of the first and second bellows diaphragms 14a, 14b for directing the laser beam to weld the inner joint between the first and second bellows diaphragms. As would also be readily understood by those skilled in the art, the laser 38 may be one of an Nd:YAG laser, a diode laser, and a $CO_2$ laser. Of course, other types of lasers are also contemplated by the present invention as would be readily understood by those skilled in the art.

The second clamp 26 may also have a recess 28 in a medial portion thereof receiving the laser beam directing means therein. In the illustrated embodiment, the laser beam directing means is provided by the 45 degree angled mirror 35. Other optical elements or devices may be similarly situated to provide the beam directing, such as a prism, lens or optical fiber end, for example, as would be readily understood by those skilled in the art. The angled mirror 35 or other laser beam directing means may comprise means for directing the laser beam to the joint within about 30 degrees from a mating surface defined between the adjacent bellows diaphragms 14a, 14b to thereby produce a high quality and symmetrical weld.

In the illustrated embodiment, the apparatus 20 includes an optical head 25 in the form of a tube. The optical head 25 mounts a first turning mirror 41 and a focusing lens 39 which also define a portion of the beam directing means in the illustrated embodiment. The illustrated camera 51 and other components are also carried in or by the optical head 25 (FIG. 2) as described in greater detail below.

The opening 23 of the first clamp 22 and the recess 28 of the second clamp 26 are preferably sized to expose a predetermined radially inwardly extending portion of the first and second bellows diaphragms 14a, 14b to facilitate welding with the laser beam 36. In addition, the apparatus 20 also preferably includes rotating drive means for relatively rotating the first and second clamps 22, 26, and the laser beam directing means, such as the illustrated 45 degree mirror 35, to weld the inner joint between the first and second bellows diaphragms 14a, 14b. In the embodiment of FIG. 1, the rotating drive means is provided by the schematically illustrated motor 42, pulley 44, drive belt 43, rotating fixture 46 and associated mounting bearing 45 to rotate the first and second clamps 22, 26 when pressed together. In other words, the clamps 22, 26 are rotated relative to the frame 21 and the laser beam directing means or mirror 35. The rotation is over 360 degrees to complete the interior weld. Of course in other embodiments, the clamps 22, 26 may be stationary and the beam directing means may be rotated as would be readily understood by those skilled in the art.

Another aspect of the invention relates to control of various components of the apparatus 20. The apparatus 20 may include a processor, such as the illustrated personal computer 50 connected to the laser 35 for controlling at least one parameter thereof. For example, the apparatus 20 may also further comprise a camera 51 directed to the weld area for assessing weld quality and/or for facilitating alignment of the laser beam with the joint. A filter 54 may be positioned in an optical path with the camera 51 to filter out the weld light as would be readily understood by those skilled in the art.

The personal computer 50 may further comprise means cooperating with the camera 51 and the laser 38 for controlling a laser power based upon the weld quality. For example, the computer 50 may control the laser power via the illustrated laser power supply 53 as would be readily understood by those skilled in the art. The power density on the mirror 35 may desirably be less than $2 \text{ kW/cm}^2$ for a long life of the mirror. The welding power may be between 30 W to 2,000 W for metal bellows welding. A welding speed of 20 ipm to 300 ipm is typical. In addition, elliptical or double-spot and uniform intensity beam shaping may be provided to improve weld appearance. This is the technique to elongate the laser beam 36 in the direction of welding to increase the beam material interaction time (dwell time) at a given welding speed. The laser welding may in conduction mode or the keyhole mode as would also be readily understood by those skilled in the art.

The camera 51 may also be connected to a display or monitor 55 to provide the operator with a real time view of the weld area as would also be readily understood by those skilled in the art. Of course, a keyboard 59 and computer monitor or display 58 may also be connected to the personal computer 50. The personal computer 50 may also control other system parameters, control welding parameters, as well as provide motion control, parts handling, database management, and system diagnostics as would also be readily understood by those of skill in the art.

Figure 4:
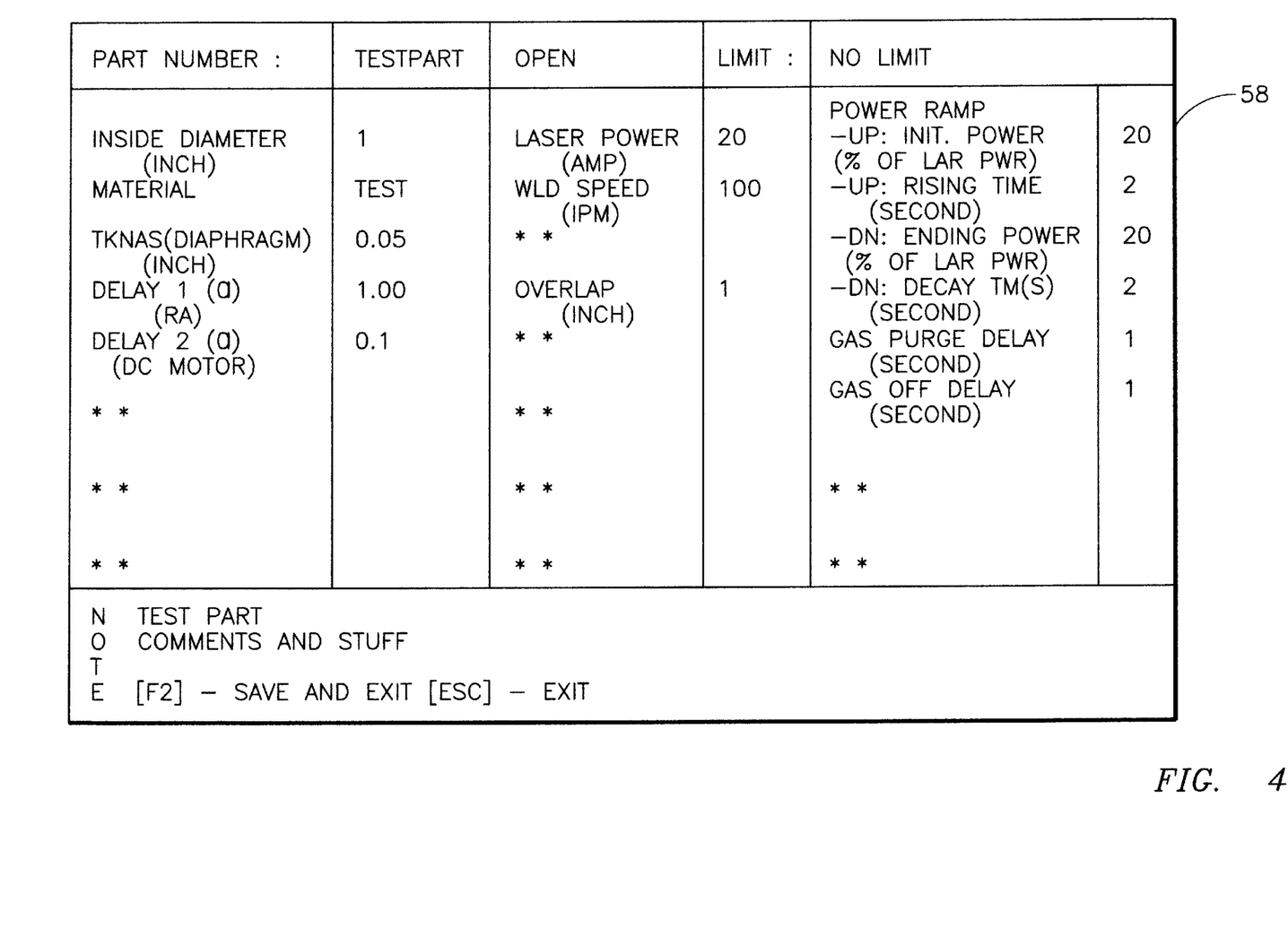
FIG. 4 is a view of a display screen for the apparatus in accordance with the present invention.

The control software is preferably menu-driven as would be readily understood by those skilled in the art. The main menu may include: File, Welding, Diagnostics, Log In/Out and Utilities. The file menu allows the user to enter relevant engineering data under corresponding part numbers. This database is used to control the laser power, table position, weld clamp rotation speed (welding speed), shielding gas, power ramp up and down, etc. for full welding control. Power programming during welding is also available. The data file allows the operator to type in the part number to control all of the necessary welding parameters automatically. A sample screen from the display 58 is shown in FIG. 4. The user-friendly software has many convenient features including setup, calibration, and system diagnostics.

The apparatus 20 may further comprise an index table 60 carrying the second clamp 26. The index table 60 may further comprise at least one additional similar clamp 26a to receive two new diaphragms 14a, 14b to be loaded while two others are welded. Once welded the index table 60 is rotated, the new diaphragms are welded in clamp 26a, while the welded convolution is removed from the clamp 26. A next pair of diaphragms are loaded into the clamp 26 and the cycle repeated. As would be readily understood by those of skill in the art, more than two clamps 26, 26a may be carried by the index table 60. The index table 60 is selectively rotated by the illustrated index motor 61 under control of the personal computer 50.

The apparatus 20 may also include respective positioners 64, 64a carried by the index table 60 for moving the second or lower clamps 26, 26a to a raised positioned pressing against the upper or first clamp 22. The positioners 64, 64a, and index motor 63 may be pneumatic, hydraulic, electrical, etc. as would be readily understood by those of skill in the art. In addition, in other embodiments, the first clamp 22 may be moved relative to the second clamp 26, or both clamps may be moved.

An inert gas supply 66, and inert gas delivery means, such as the schematically illustrated line 67, may be used for delivering inert gas to the weld area. For example, the inert gas may be argon and may be delivered to one or both of the interior and exterior of the weld area.

Figure 3:
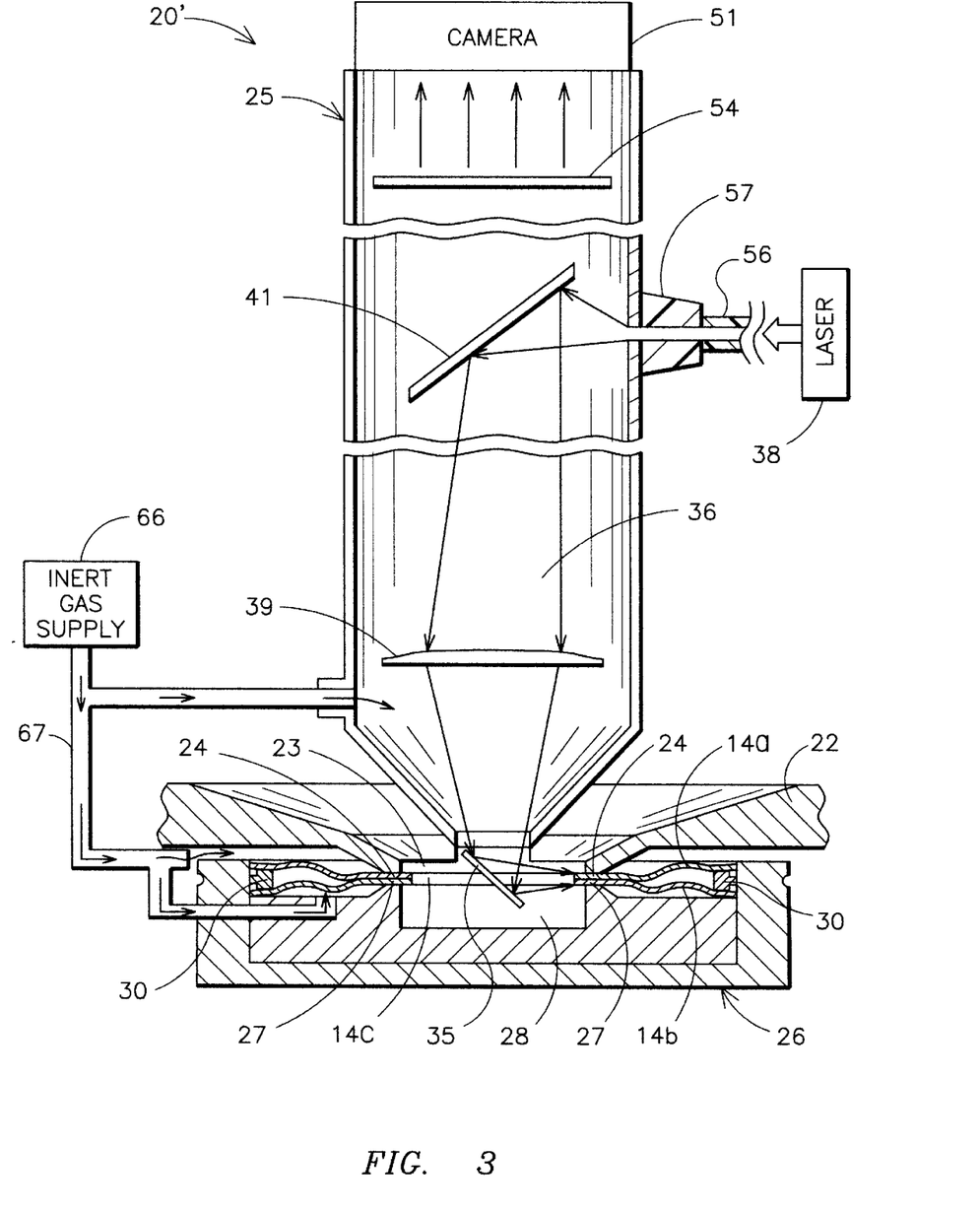
FIG. 3 is a greatly enlarged portion of an alternate embodiment of the apparatus in accordance with the present invention.

Turning now briefly to the embodiment of the apparatus 20' as shown in FIG. 3, another variation of beam delivery is explained. In this embodiment, the laser beam directing means includes an optical fiber 56 and one or more connectors 57 as would be readily understood by those skilled in the art. In other embodiments of the invention, the beam 36 may be directed to the interior joint from outside the openings in the bellows and clamps, for example.

A method aspect of the invention is for forming a welded inner joint between first and second bellows diaphragms 14a, 14b, and with each bellows diaphragm having an opening therein. The method preferably comprises the steps of: providing a first clamp 22 having an opening 23 therein, the first clamp having portions 24 adjacent the opening defining a first clamping surface; providing a second clamp 26 having portions 27 defining a second clamping surface; and relatively positioning the first and second clamps to clamp the first and second metal bellows diaphragms together between the first and second clamping surfaces so that the openings in the bellows diaphragms are generally aligned with the opening in the first clamp. The method preferably further includes the steps of: positioning an optical element, such as the mirror 35 in the opening of the first clamp and the openings of the first and second bellows diaphragms; directing a laser beam 36 to the optical element to weld the inner joint between the first and second bellows diaphragms; and relatively rotating the first and second clamps 22, 26 and/or the optical element to weld the inner joint between the first and second bellows diaphragms.

Figure 5:
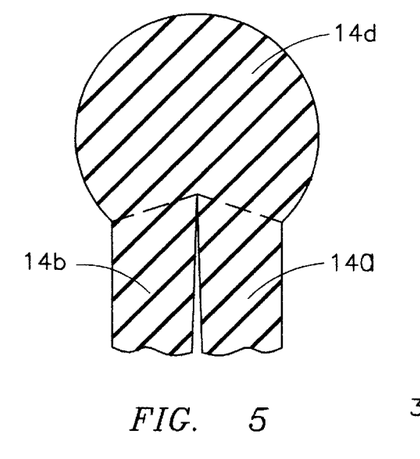
FIG. 5 is a greatly enlarged cross-sectional diagram of the welded portion of the diaphragms produced according to the present invention.

Laser welding overcomes the basic limitations of arc welding, such as slowness and frequent maintenance requirements. The laser may improve the welding speed by five fold compared to conventional arc welding, for example. As shown in the enlarged cross-section of FIG. 5 the roll-over (the rounded width of the weld bead 14d) was minimized for a better performance (more stroke) of the bellows. The quality of the welds passed or exceeded all of the engineering specifications for the conventional arc welding. Stainless steel diaphragms as thin as of 0.002" were welded. In short, the benefits of laser welding using the apparatus 20 and methods described herein for the inside joints of metal bellows include:

1. Productivity Increases
   a. Laser welding is five to ten times faster than conventional arc welding.
   b. A long training period for skilled operators is not necessary as for conventional arc welding.
   c. Production capacity is increased considerably.
   d. Production personnel problems are minimized.
2. Projected Cost Savings
   a. Materials and consumable savings.
   b. Labor savings.
3. Quality Improvement
   a. Weld defects arising from manual tracking can be eliminated.
   b. Laser produces consistently high quality welds since there is a no tool (tip) wear.
   c. Laser welds are stronger than conventional arc welds due to less heat input.
   d. Laser welds have less roll-over.
   e. Laser welds are cosmetically superior.

Figure 6:
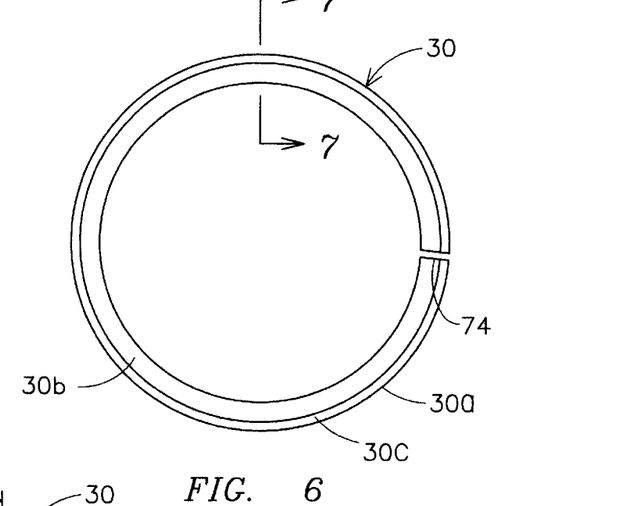
FIG. 6 is a top plan view of a spacer in accordance with another aspect of the present invention.
Figures 7, 8:
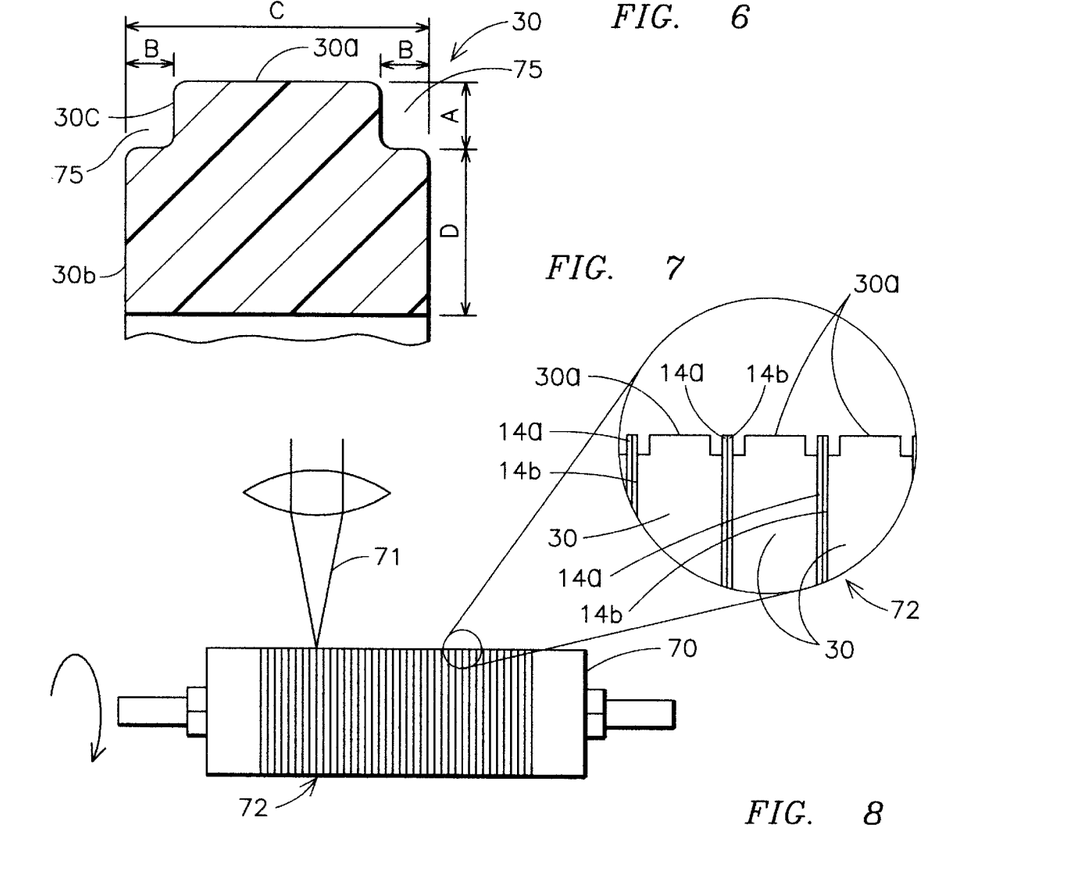
FIG. 7 is a cross-sectional view taken along lines 7—7 of FIG. 6.
FIG. 8 is a side elevational view of an assembly of bellows diaphragms and spacers positioned on an arbor for forming outer welds in accordance with the invention.

Another aspect of the invention relates to use of the spacers 30 during manufacturing of the metal bellows as understood with further reference to FIGS. 6–8. Laser welding of precision metal bellows requires chill rings or spacers 30 between convolutions for clamping outer edges of the diaphragms for welding. These spacers are placed between diaphragms before the interior joint is welded. Conventional spacers are made of copper, brass, or stainless steel. Some are disposable and others are reusable. The design of chill rings or spacers 30 affects the welding performance.

This aspect of the invention is directed to an assembly 72 of diaphragms 14a, 14b and spacers 30 (FIG. 8) which may be positioned on the illustrated arbor 70 during manufacturing, such as for forming the outer welds with the illustrated laser beam 71. The welding of the outer joints is further described in the above cited related patent application and needs no further description herein.

The assembly 72 comprises a plurality of bellows diaphragms 14a, 14b positioned in side-by-side relation, and a respective spacer 30 positioned between each pair of adjacent bellows diaphragms. More particularly, according to this aspect of the invention, the spacer 30 comprises a non-metallic material. The conventional spacers are relatively expensive, and the spacers 30 in accordance with the invention will be relatively inexpensive. The spacer 30 may be disposable because of its low cost, or alternately, the spacer may be reusable to further reduce manufacturing costs.

The non-metallic material of the spacer 30 preferably comprises at least one of plastic, rubber, glass, and ceramic. The non-metallic material may also have a relatively high melting temperature in a range of about 400 to 2500 degrees F to resist melting during laser welding of the bellows diaphragms. In addition, the non-metallic material may comprise a material having a relatively low thermal conductivity less than a thermal conductivity of copper which is about 0.94 cal/cm$^2$/cm/° C./sec. The non-metallic material may also be transparent or translucent to the laser wavelength to thereby have a reduced energy absorption. For example, the spacer 30 may comprise a material having less than about a 50% absorption of the laser energy. Accordingly, the spacer 30 may permit better use of the laser power while maintaining the clamping of the diaphragms for welding.

The non-metallic material may be a plastic or polymer with specific properties suited for use as a spacer in welding. More particularly, the material may desirably: have a high strength at high temperatures, be transparent or have a low absorption for the specific laser wavelength, be strong enough yet flexible to be removed from the assembly 72 after welding is competed, have a low thermal conductivity, be readily manufacturable, and have good dimensional stability. The following plastics are among those suitable for welding: ABS/SAN resins, acrylic, thermoplastics, polyamide-imide, polycarbonate, polyetherimide polyimide, polyketones, polymethypentene, sulfone polymers, allyl, aminos, cellulosics, fluoroplastics, nylons, phenolic, polybenzimidazole, polyester, polyolefins, polyphenylene ether, polyphenylene sulfide, polystyrene, and polyvinyl chloride.

The plastics, for example, can be injection molded, machined, thermoformed, and/or compression molded to a desired shape. These materials are not only suitable for laser welding, but may also find use in conventional arc welding, as well, as would be readily understood by those skilled in the art.

The spacer 30 preferably has a ring shape as illustrated. In addition, the spacer 30 preferably has a peripheral surface 30a being aligned substantially flush with an imaginary cylinder defined by peripheral surfaces of the adjacent bellows diaphragms 14a, 14b. The spacer may also have a parting slit 74 therein to facilitate removal.

The bellows diaphragms 14a, 14b preferably define a natural pitch; and the spacer 30 may have a thickness C in a range of about 0.5 to 1.5 times the natural pitch of the bellows diaphragms. In addition, the spacer 30 may comprise a first portion 30b with a generally rectangular cross-section defining opposing sidewalls contacting the adjacent bellows diaphragms 14a, 14b, and a second portion 30c extending radially outwardly from the first portion and having a reduced thickness so as to define a notch 75 between adjacent bellows diaphragms.

Each bellows diaphragm 14a, 14b preferably has a predetermined thickness. Accordingly, the first spacer portion 30b may have a radial dimension D of greater than about 0.5 times the predetermined thickness of each bellows diaphragm. Further relating to preferred dimensions, the notch 75 preferably has a predetermined width B in a range of about 0.2 to 20 times the predetermined thickness of each bellows diaphragm. The notch 75 also preferably has a depth A in a range of about 1 to 10 times the predetermined thickness of each bellows diaphragm.

Another method aspect of the invention is for manufacturing a metal bellows comprising the step of: providing a plurality of non-metallic spacers 30 and providing a plurality of metal bellows diaphragms 14a, 14b; positioning the plurality of bellows diaphragms in side-by-side relation with a respective non-metallic spacer between each pair of adjacent bellows diaphragms; and welding the bellows diaphragms together to thereby form the metal bellows. The welding may preferably be laser welding, but may also be conventional arc welding. The method may further comprise the step of removing the non-metallic spacers 30 from the metal bellows after the welding step, and may include reusing the non-metallic spacers after removal.

Many other modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. An apparatus for forming a welded inner joint between first and second bellows diaphragms, each bellows diaphragm having an opening therein, said apparatus comprising:

a first clamp having an opening therein, said first clamp having portions adjacent said opening defining a first clamping surface;

a second clamp having portions defining a second clamping surface, said first and second clamps being relatively movable to clamp the first and second metal bellows diaphragms together between the first and second clamping surfaces so that the openings in the bellows diaphragms are generally aligned with the opening in said first clamp;

a laser for generating a laser beam;

laser beam directing means having at least a portion positioned in the opening of said first clamp and the openings of the first and second bellows diaphragms for directing the laser beam to weld the inner joint between the first and second bellows diaphragms; and rotating drive means for relatively rotating said first and second clamps and said laser beam directing means to weld the inner joint between the first and second bellows diaphragms.

2. An apparatus according to claim 1 further comprising a frame; wherein said laser beam directing means is connected to said frame; and wherein said rotating drive means rotates said first and second clamps relative to said laser beam directing means.

3. An apparatus according to claim 1 wherein said second clamp has a recess in a medial portion thereof receiving said laser beam directing means therein.

4. An apparatus according to claim 3 wherein the opening of said first clamp and the recess of said second clamp are sized to expose a predetermined radially inwardly extending portion of the first and second bellows diaphragms.

5. An apparatus according to claim 1 wherein said laser beam directing means comprises an optical element and mounting means for mounting said optical element in the opening of said first clamp and in the openings of the first and second bellows diaphragms.

6. An apparatus according to claim 1 wherein said laser beam directing means comprises an optical fiber.

7. An apparatus according to claim 1 wherein said laser beam directing means comprises:

an optical fiber connected to said laser; and at least one optical element in an optical path from said optical fiber.

8. An apparatus according to claim 1 wherein said laser beam directing means comprises a focusing lens in an optical path of the laser beam.

9. An apparatus according to claim 1 further comprising a processor connected to said laser for controlling at least one parameter thereof.

10. An apparatus according to claim 9 further comprising a camera directed to the weld area for assessing weld quality; and wherein said processor further comprises means cooperating with said camera and said laser for controlling a laser power based upon the weld quality.

11. An apparatus according to claim 9 further comprising a camera directed to the weld area; and wherein said processor further comprises means cooperating with said camera and said laser beam directing means for controlling an alignment of the laser beam based upon an image from said camera.

12. An apparatus according to claim 10 further comprising a filter in an optical path with said camera to filter weld light.

13. An apparatus according to claim 10 further comprising a display connected to said camera.

14. An apparatus according to claim 1 further comprising an index table carrying said second clamp; and further comprising at least one additional clamp carried by said indexing table to permit welded bellows diaphragms to be removed and new bellows diaphragms to be loaded, and while the second clamp is used during welding.

15. An apparatus according to claim 1 further comprising an inert gas supply, and inert gas delivery means for delivering inert gas to at least one of an interior and exterior of the weld area.

16. An apparatus according to claim 1 further comprising positioning means for moving said first and second clamps between a clamped position and a separated position.

17. An apparatus according to claim 1 wherein said laser is one of an Nd:YAG laser, a diode laser, and a $CO_2$ laser.

18. An apparatus according to claim 1 wherein said laser beam directing means comprises means for directing the laser beam to the joint within about 30 degrees from a mating surface between the first and second bellows diaphragms.

19. An apparatus according to claim 1 further comprising a processor operatively connected to said laser; and wherein said processor comprises means for storing and recalling information relating to a bellows part designation and welding parameters associated therewith.

20. An apparatus for forming a welded inner joint between first and second bellows diaphragms, each bellows diaphragm having an opening therein, said apparatus comprising:

a first clamp having an opening therein, said first clamp having portions adjacent said opening defining a first clamping surface;

a second clamp having portions defining a second clamping surface, said first and second clamps being relatively movable to clamp the first and second metal bellows diaphragms together between the first and second clamping surfaces;

a laser for generating a laser beam;

laser beam directing means for directing the laser beam through the opening of said first clamp to weld the inner joint between the first and second bellows diaphragms;

rotating drive means for relatively rotating said first and second clamps and said beam directing means to weld the inner joint between the first and second bellows diaphragms;

an index table carrying said second clamp; and at least one additional clamp carried by said index table to permit welded bellows diaphragms to be removed and new bellows diaphragms to be loaded.

21. An apparatus according to claim 20 further comprising a frame; wherein said beam directing means is connected to said frame; and wherein said rotating drive means rotates said first and second clamps relative to said beam directing means.

22. An apparatus according to claim 20 wherein said second clamp has a recess in a medial portion thereof receiving at least a portion of said beam directing means therein.

23. An apparatus according to claim 22 wherein the opening of said first clamp and the recess of said second clamp are sized to expose a predetermined radially inwardly extending portion of the first and second bellows diaphragms.

24. An apparatus according to claim 20 wherein said laser beam directing means comprises an optical element and mounting means for mounting said optical element in the opening of said first clamp and in the openings of the first and second bellows diaphragms.

25. An apparatus according to claim 20 further comprising an optical fiber connected in the optical path from said laser to said beam directing means.

26. An apparatus according to claim 20 further comprising a processor connected to said laser for controlling at least one parameter thereof.

27. An apparatus according to claim 26 further comprising a camera directed to the weld area for assessing weld quality; and wherein said processor further comprises means for controlling a laser power based on the weld quality.

28. An apparatus according to claim 26 further comprising a camera directed to the weld area; and wherein said processor further comprises means cooperating with said camera and said laser beam directing means for controlling an alignment of the laser beam based upon an image from said camera.

29. An apparatus according to claim 20 further comprising an inert gas supply, and inert gas delivery means for delivering inert gas to at least one of an interior and exterior of the weld area.

30. An apparatus according to claim 20 further comprising positioning means for moving said first and second clamps between a clamped position and a separated position.

31. An apparatus according to claim 20 wherein said laser is one of an Nd:YAG laser, a diode laser, and a $CO_2$ laser.

32. An apparatus according to claim 20 further comprising a processor operatively connected to said laser; and wherein said processor comprises means for storing and recalling information relating to a bellows part designation and welding parameters associated therewith.

33. A method for forming a welded inner joint between first and second bellows diaphragms, each bellows diaphragm having an opening therein, the method comprising the steps of:

providing a first clamp having an opening therein, the first clamp having portions adjacent the opening defining a first clamping surface;

providing a second clamp having portions defining a second clamping surface;

relatively positioning the first and second clamps to clamp the first and second metal bellows diaphragms together between the first and second clamping surfaces so that the openings in the bellows diaphragms are generally aligned with the opening in the first clamp;

positioning at least a portion of a beam directing element in the opening of the first clamp and the openings of the first and second bellows diaphragms;

directing a laser beam to the beam directing element to weld the inner joint between the first and second bellows diaphragms; and relatively rotating the first and second clamps and the beam directing element to weld the inner joint between the first and second bellows diaphragms.

34. A method according to claim 33 wherein the step of directing the laser beam comprises directing the laser beam through an optical fiber.

35. A method according to claim 33 further comprising the step of controlling at least one parameter of the laser beam.

36. A method according to claim 35 further comprising the step of using a camera for assessing weld quality; and wherein the step of controlling at least one parameter comprises controlling a laser power based upon the weld quality.

37. A method according to claim 33 further comprising the step of delivering inert gas to at least one of an interior and exterior of the weld area.

38. A method according to claim 33 wherein the step of directing the laser beam comprises directing the laser beam to the joint within about 30 degrees from a mating surface between the first and second bellows diaphragms.

39. An apparatus for forming a welded inner joint between first and second bellows diaphragms, each bellows diaphragm having an opening therein, said apparatus comprising:

a first clamp having portions defining a first clamping surface and a second clamp having portions defining a second clamping surface, said first and second clamps being relatively movable to clamp the first and second metal bellows diaphragms together between the first and second clamping surfaces;

a laser for generating a laser beam;

laser beam directing means for directing the laser beam to weld the inner joint between the first and second bellows diaphragms; and a processor operatively connected to said laser and said laser beam directing means, said processor comprising means for storing and recalling information relating to a bellows part designation and welding parameters associated therewith.

40. An apparatus according to claim 39 further comprising rotating drive means for relatively rotating said first and second clamps and said laser beam directing means to weld the inner joint between the first and second bellows diaphragms.

41. An apparatus according to claim 39 further comprising a frame; wherein said laser beam directing means is connected to said frame; and wherein said rotating drive means rotates said first and second clamps relative to said laser beam directing means.

42. An apparatus according to claim 41 further comprising a camera directed to the weld area for assessing weld quality; and wherein said processor further comprises means cooperating with said camera and said laser for controlling a laser power based upon the weld quality.

43. An apparatus according to claim 41 further comprising a camera directed to the weld area; and wherein said processor further comprises means cooperating with said camera and said laser beam directing means for controlling an alignment of the laser beam based upon an image from said camera.

44. An apparatus according to claim 39 further comprising an index table carrying said second clamp; and further comprising at least one additional clamp carried by said indexing table to permit welded bellows diaphragms to be removed and new bellows diaphragms to be loaded, and while the second clamp is used during welding.

45. An apparatus according to claim 39 wherein said laser beam directing means comprises means for directing the laser beam to the joint within about 30 degrees from a mating surface between the first and second bellows diaphragms.

* * * * *